(12) United States Patent
Kim et al.

(10) Patent No.: US 11,832,325 B2
(45) Date of Patent: Nov. 28, 2023

(54) ALLOCATION OF LINK ID FOR TRANSMITTING MULTI-LINK INFORMATION

(71) Applicant: LG Electronics Inc., Seoul (KR)

(72) Inventors: Jeongki Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 141 days.

(21) Appl. No.: 17/465,603

(22) Filed: Sep. 2, 2021

(65) Prior Publication Data

US 2022/0141901 A1 May 5, 2022

(30) Foreign Application Priority Data

Oct. 29, 2020 (KR) .......................... 10-2020-0142267

(51) Int. Cl.
*H04W 76/15* (2018.01)
*H04W 84/12* (2009.01)

(52) U.S. Cl.
CPC ............ *H04W 76/15* (2018.02); *H04W 84/12* (2013.01)

(58) Field of Classification Search
CPC ..... H04W 76/15; H04W 84/12; H04W 76/27; H04W 76/11
See application file for complete search history.

(56) References Cited

U.S. PATENT DOCUMENTS

2019/0082373 A1* 3/2019 Patil ...................... H04L 1/1614
2019/0335454 A1* 10/2019 Huang .................. H04W 48/08
2020/0267541 A1* 8/2020 Huang .................. H04W 12/10

OTHER PUBLICATIONS

LAN/MAN Standards Committee, "Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)," IEEE P802.11be™/D0.2, Dec. 2020, 11 pages.

* cited by examiner

*Primary Examiner* — Mohammad S Anwar
(74) *Attorney, Agent, or Firm* — Fish & Richardson P.C.

(57) ABSTRACT

In a wireless local area network system, a transmitting multi-link device (MLD) includes at least one transmitting station (STA). The transmitting STA generates a multi-link (ML) element and transmits the ML element. The ML element includes a common information field and information related to each transmitting STA. The information related to each transmitting STA includes a first link identifier (ID) field and a first link information field that includes information related to a transmitting STA operating in a link related to the first link field. The first link information field includes information commonly related to all transmitting STAs included in the transmitting MLD based on the first link ID field having a first value.

7 Claims, 12 Drawing Sheets

| Element ID | Length | Element ID Extension | Multi-Link Control | MLD MAC Address | TBD | Optional Subelements |
|---|---|---|---|---|---|---|
| 1 | 1 | 1 | 2 | 0 or 6 | TBD | variable |

Octets:

FIG. 8

| Subelement ID | Name | Extensible |
|---|---|---|
| 0 | Pre-STA Profile | Yes |
| 1~220 | Reserved | |
| 221 | Vendor Specific | Vendor defined |
| 222~255 | Reserved | |

Bits:   TBD    TBD

ALLOCATION OF LINK ID FOR TRANSMITTING MULTI-LINK INFORMATION

CROSS-REFERENCE TO RELATED APPLICATIONS

Pursuant to 35 U.S.C. § 119 (a), this application claims the benefit of Korean Patent Application No. 10-2020-0142267, filed on Oct. 29, 2020, the contents of which are all hereby incorporated by reference herein in their entirety.

BACKGROUND

Field

The present specification relates to a method for allocating a link identifier (ID) to transmit multi-link information in a wireless local area network system.

Related Art

A wireless local area network (WLAN) has been enhanced in various ways. For example, the Institute of Electrical and Electronics Engineers (IEEE) 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

In a wireless local area network system according to various embodiments, a transmitting multi-link device (MLD) may include at least one transmitting station (STA). The transmitting STA may generate a multi-link (ML) element and transmit the ML element. The ML element may include a common information field and information related to each transmitting STA. The information related to each transmitting STA may include a first link identifier (ID) field and a first link information field that includes information related to a transmitting STA operating in a link related to the first link field. The first link information field may include information commonly related to all transmitting STAs included in the transmitting MLD based on the first link ID field having a first value.

According to an example of the present specification, by using a specific value of link ID, common information can be extended in the ML element, and information (element or fields) about STAs belonging to a specific group can be transmitted. That is, when a plurality of STAs have common information, there is no need to individually and repeatedly transmit the common information and information related to all STAs of a specific group can be transmitted through one signaling. Accordingly, signaling overhead can be obtained.

BRIEF DESCRIPTION OF THE DRAWINGS

FIG. 6 is a diagram illustrating a format of a multi-link element.

FIG. 8 is a diagram illustrating a sub-element ID field value.

DESCRIPTION OF EXEMPLARY EMBODIMENTS

Figure 1:
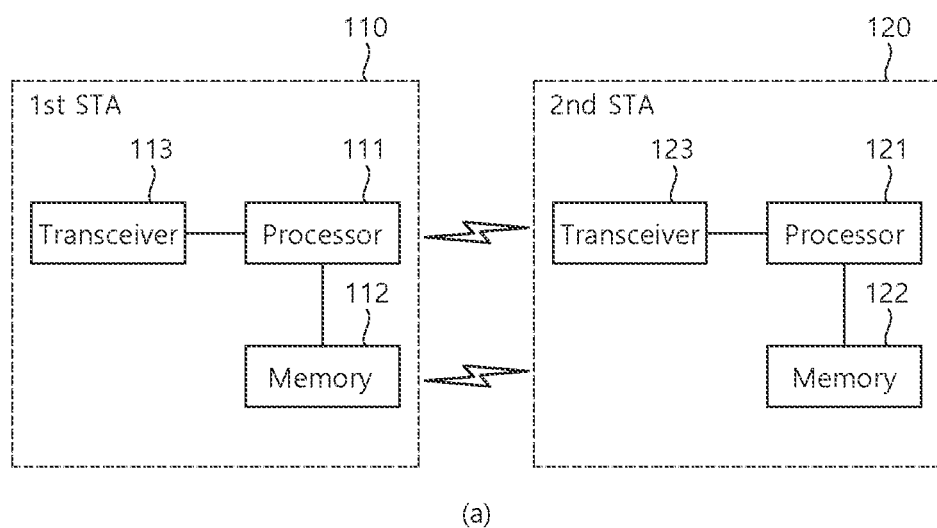
FIG. 1 shows an example of a transmitting apparatus and/or receiving apparatus of the present specification.
Figure 1:
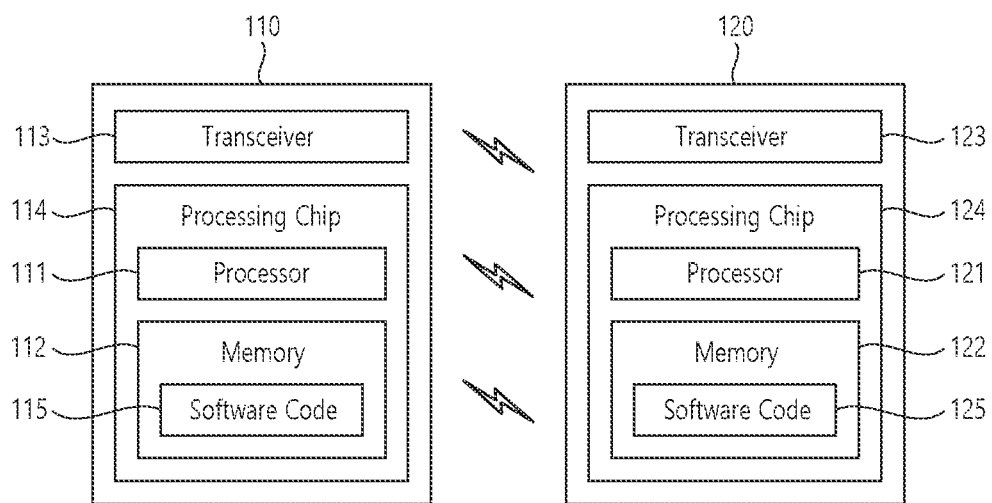

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
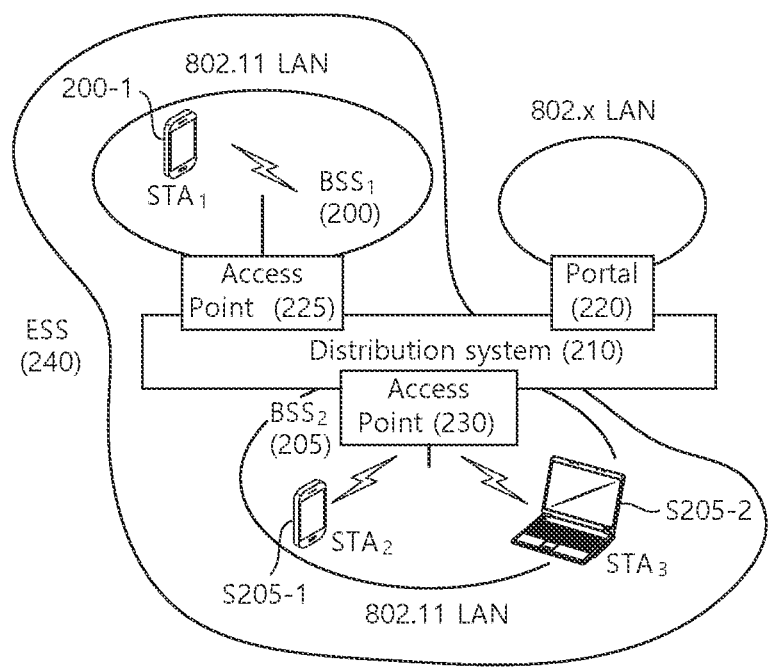
FIG. 2 is a conceptual view illustrating the structure of a wireless local area network (WLAN).
Figure 2:
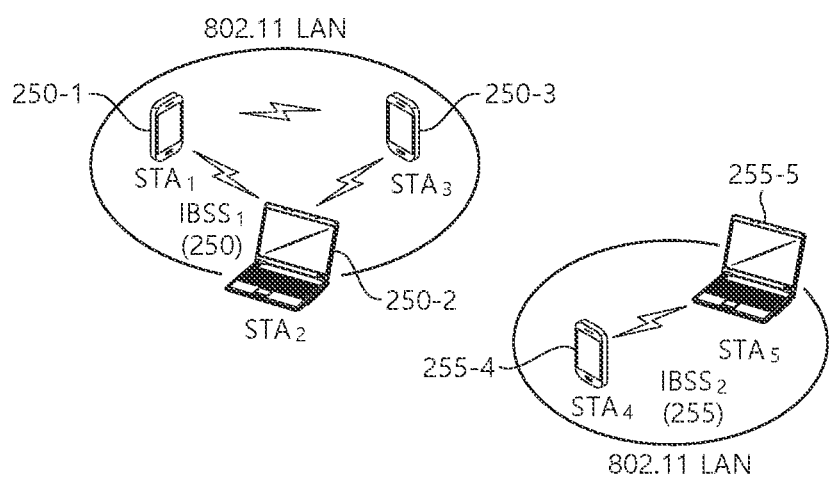

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
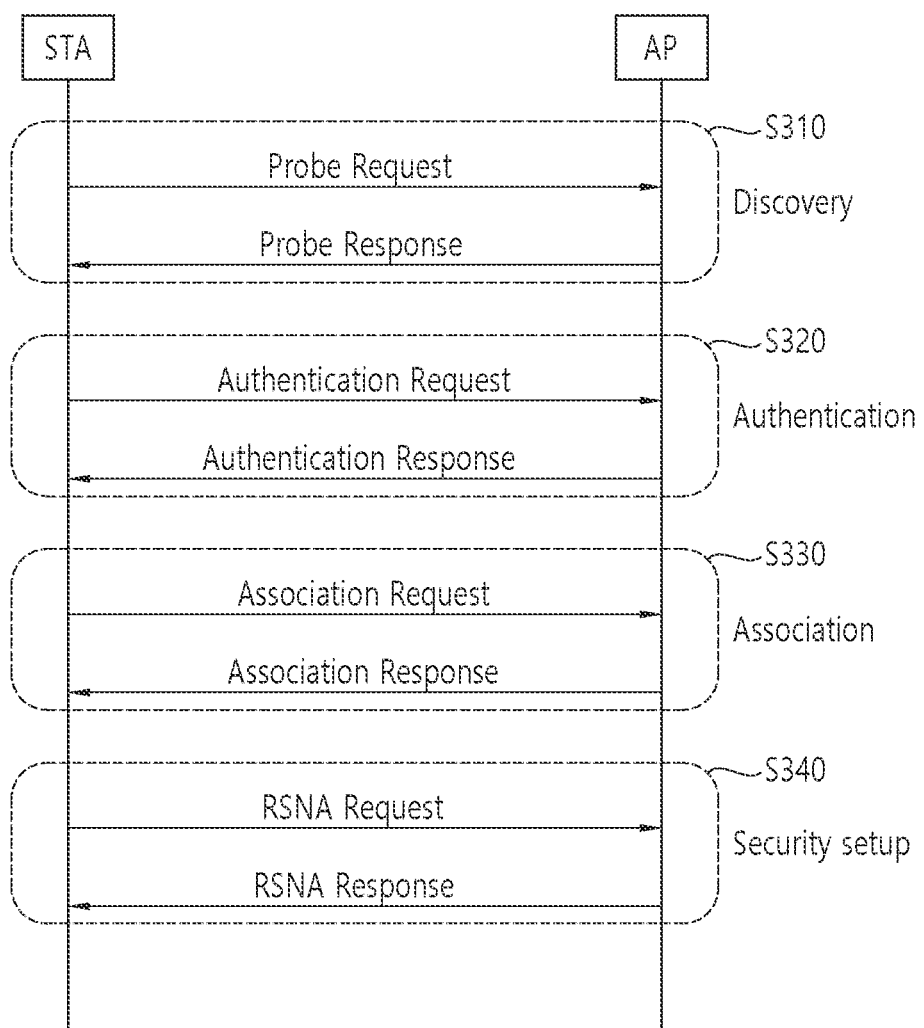
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an MSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Hereinafter, a PPDU transmitted/received in a STA of the present specification will be described.

Figure 4:
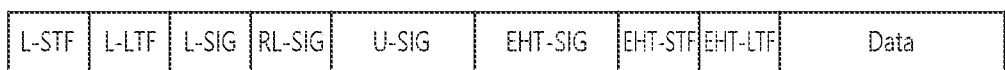
FIG. 4 illustrates an example of a PPDU used in the present specification.

FIG. 4 illustrates an example of a PPDU used in the present specification.

The PPDU of FIG. 4 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 4 may indicate the entirety or part of a PPDU type used in the EHT system. For example, the example of FIG. 4 may be used for both of a single-user (SU) mode and a multi-user (MU) mode. In other words, the PPDU of FIG. 4 may be a PPDU for one receiving STA or a plurality of receiving STAs. When the PPDU of FIG. 4 is used for a trigger-based (TB) mode, the EHT-SIG of FIG. 4 may be omitted. In other words, a STA which has received a trigger frame for uplink-MU (UL-MU) may transmit the PPDU in which the EHT-SIG is omitted in the example of FIG. 4.

In FIG. 4, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 4 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 4, the L-LTF and the L-STF may be the same as those in the conventional fields.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 4. The U-SIG may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

The common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. Each user field may be related to MU-MIMO allocation, or may be related to non-MU-MIMO allocation.

The common field of the EHT-SIG may include a CRC bit and a tail bit. A length of the CRC bit may be determined as 4 bits. A length of the tail bit may be determined as 6 bits, and may be set to '000000'.

The common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits).

In the following example, a signal represented as a (TX/RX/UL/DL) signal, a (TX/RX/UL/DL) frame, a (TX/ RX/UL/DL) packet, a (TX/RX/UL/DL) data unit, (TX/RX/ UL/DL) data, or the like may be a signal transmitted/ received based on the PPDU of FIG. 4. The PPDU of FIG. 4 may be used to transmit/receive frames of various types. For example, the PPDU of FIG. 4 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 4 may be used for a management frame. An example of the management frame may include a beacon frame, a (re-)association request frame, a (re-)association response frame, a probe request frame, and a probe response frame. For example, the PPDU of FIG. 4 may be used for a data frame. For example, the PPDU of FIG. 4 may be used to simultaneously transmit at least two or more of the control frame, the management frame, and the data frame.

Figure 5:
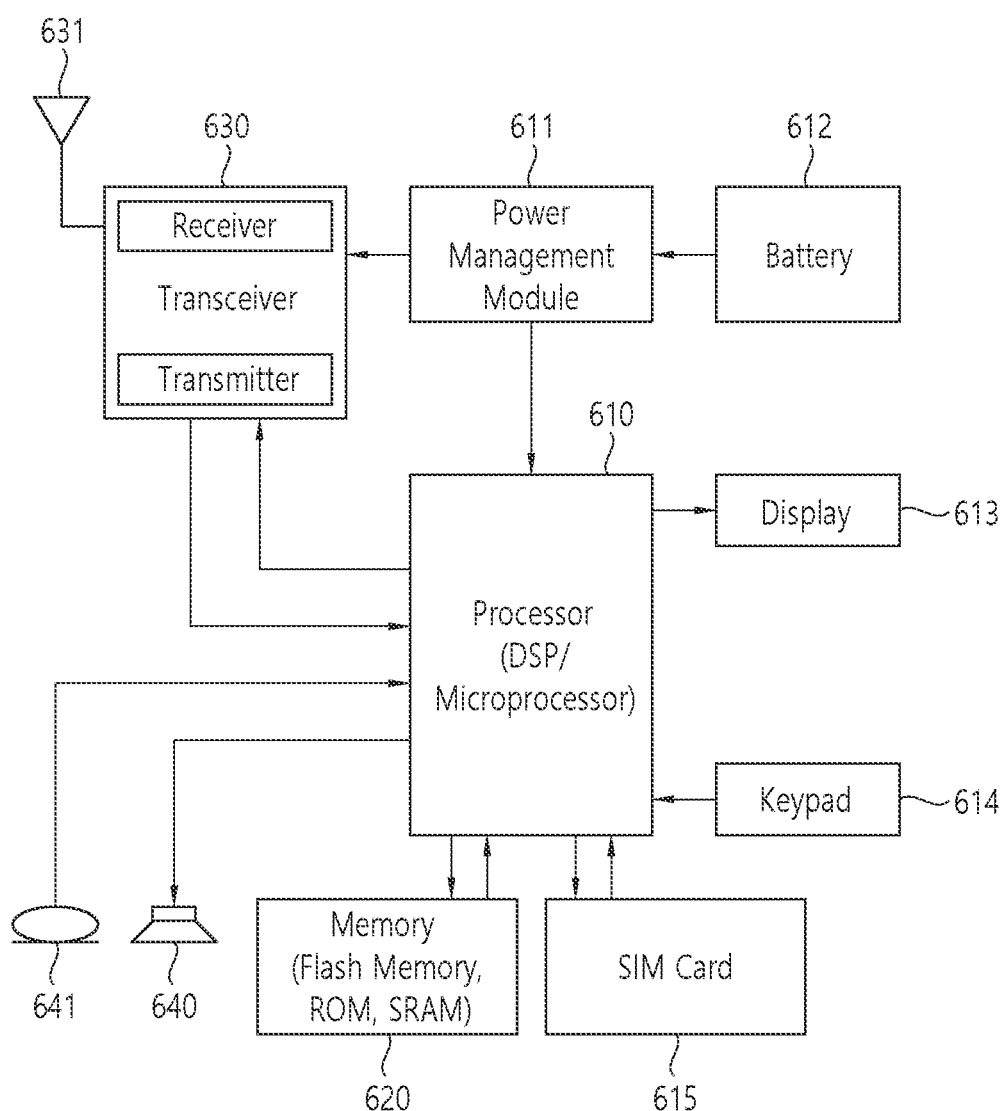
FIG. 5 illustrates an example of a modified transmission device and/or receiving device of the present specification.

FIG. 5 illustrates an example of a modified transmission device and/or receiving device of the present specification.

Each device/STA of the sub-figure (a)/(b) of FIG. 1 may be modified as shown in FIG. 5. A transceiver 630 of FIG. 5 may be identical to the transceivers 113 and 123 of FIG. 1. The transceiver 630 of FIG. 5 may include a receiver and a transmitter.

A processor 610 of FIG. 5 may be identical to the processors 111 and 121 of FIG. 1. Alternatively, the processor 610 of FIG. 5 may be identical to the processing chips 114 and 124 of FIG. 1.

A memory 620 of FIG. 5 may be identical to the memories 112 and 122 of FIG. 1. Alternatively, the memory 620 of FIG. 5 may be a separate external memory different from the memories 112 and 122 of FIG. 1.

Referring to FIG. 5, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 5, a speaker 640 may output a result related to a sound processed by the processor 610. A microphone 641 may receive an input related to a sound to be used by the processor 610.

1. Power Save

Each link may be enabled/disabled (or may be called as activated/de-activated). An STA operating in an enabled link may operate in an active mode/power saving mode. The STA in the power saving mode may operate in an awake state/ doze state.

For each enabled link, frame exchange may be performed when the corresponding non-AP STA of the enabled link remains in the awake state.

NOTE 1—A link is enabled when the link can be used to exchange frames depending on the STA's power state.

NOTE 2—When a link is disabled by the MLD (i.e., not enabled), frame exchange cannot be performed.

An AP of the AP MLD may transmit a frame carrying an indication of buffered data through a link for transmission through the other enabled link(s).

An AP MLD may recommend non-AP MLD to utilize more than one enabled link. An indication of the AP may be transmitted in a broadcast frame or unicast frame.

In the case of link establishment between an AP MLD and a non-AP MLD, the non-AP STA operating on a link may transmit, to an AP operating on the link, information that other non-AP STA in the same non-AP MLD is switched to the doze state and is in the awake state.

A non-AP MLD may monitor and perform basic operations (e.g., marking traffic, updating basic service set (BSS) parameters, etc.) on one or more links.

Each non-AP STA associated with a non-AP MLD operating in an enabled link may maintain its own power state/mode.

2. Multi-Link (ML) Element

FIG. 6 is a diagram illustrating a format of a multi-link element.

Referring to FIG. 6, a frame including an ML element and usage of the ML element are described in Section 35.3.2 "Container for multi-link information" of IEEE802.11be Draft Version D0.2 document.

The element ID, length, and element ID extension fields are defined in Section 9.4.2.1 "General" of the relevant standard documents.

Figure 7:
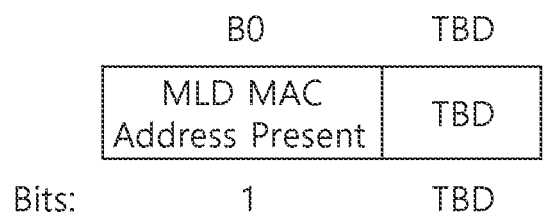
FIG. 7 is a diagram illustrating an example of the format of a multi-link control field element.

FIG. 7 is a diagram illustrating an example of the format of a multi-link control field element.

Referring to FIG. 7, an MLD MAC address presence subfield is set to 1 when there is an MLD MAC address field in the element. Otherwise, the subfield is set to 0. The MLD MAC address existence condition is defined in Section 35.3.5.4 "Usage and Rules of Multi-Link Element in Multi-Link Establishment Context" and Section 35.3.4.3 "Multi-Link Element" of the relevant standard documents.

Other subfields are to be determined.

The MLD MAC address field specifies the MAC address of the MLD. Other fields are to be determined.

An optional sub-elements field may have zero or more sub-elements. Sub-element format and order of sub-element are defined in Section 9.4.3 "Sub-element" of the relevant standard documents.

FIG. 8 is a diagram illustrating a sub-element ID field value.

Referring to FIG. 8, the sub-element ID field may be a value for prescribed sub-elements. Each Per-STA Profile sub-element starts with the Per-STA Control field and a variable number of fields and elements defined in Section 35.3.2 "Container of Multi-Link Information" of the relevant standard documents.

Figure 9:
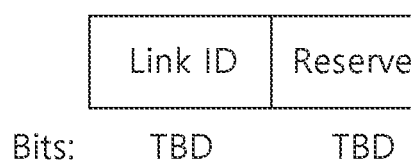
FIG. 9 is a diagram illustrating an example of a Per-STA Control field format.

FIG. 9 is a diagram illustrating an example of a Per-STA Control field format.

Referring to FIG. 9, a Link ID subfield may specify a value that uniquely identifies a link in which the reported STA is operating. The other subfields are to be determined. A vendor-specific sub-element can have the same format as the corresponding element. Zero or more vendor-specific sub-elements may be included in the optional sub-element list.

As mentioned above, a Link ID is a value uniquely identifying the link on which the reported STA operates. One non-AP STA and one AP STA may be mapped to one link. The non-AP STA/AP can know which non-AP STA/AP is located on which link through the Link ID. The Link ID may be included in the Per-STA Profile of the ML element, and the Link ID may be related to information related to which STA is designated by the Per-STA Profile.

The conventional Link ID is an ID indicating the STA in the MLD, and, as mentioned above, may be used when indicating or transmitting information related to a specific link (or an STA corresponding to the specific link). In particular, the Link ID may be included in the Per-STA profile of the ML element. In this specification, we propose a method for including an information element having a common value for all terminals (AP or non-AP STA) in the MLD, rather than an information element for a specific terminal in the ML element.

A specific value of Link ID may be used when an element common to all terminals in the MLD is included. That is, the Link ID having a specific value may be related to all STAs (AP/Non-AP STA) in the MLD. The specific value may be all bits of the Link ID field set to 0 or all bits set to 1 but is not limited thereto.

The Link ID pointing to a specific value may point to all STAs in the MLD as mentioned above but may be set differently. For example, the Link ID having a specific value may indicate only an enabled STA among all STAs (AP/non-AP STAs) in the MLD. A specific value for this may be used as a value different from the Link ID value indicating all STAs in the MLD. For example, another specific value of the Link ID may indicate both a terminal in an active mode and a terminal in an awake state among STAs in the MLD. For example, another specific value of the Link ID may indicate all terminals in a doze state among STAs in the MLD. For example, another specific value of the Link ID may indicate all terminals in power saving mode among STAs in the MLD.

For example, when the ML element includes a Per-STA Profile including a first link ID related to all STAs in the MLD and a Per-STA Profile including a second link ID for a specific STA, information included in the Per-STA Profile including the second link ID may be related to the specific STA but information included in the Per-STA Profile including the first link ID may not be related to the specific STA. That is, when both information for all STAs and information for the specific STA are included, information for the specific STA may override information for all STAs.

Figure 10:
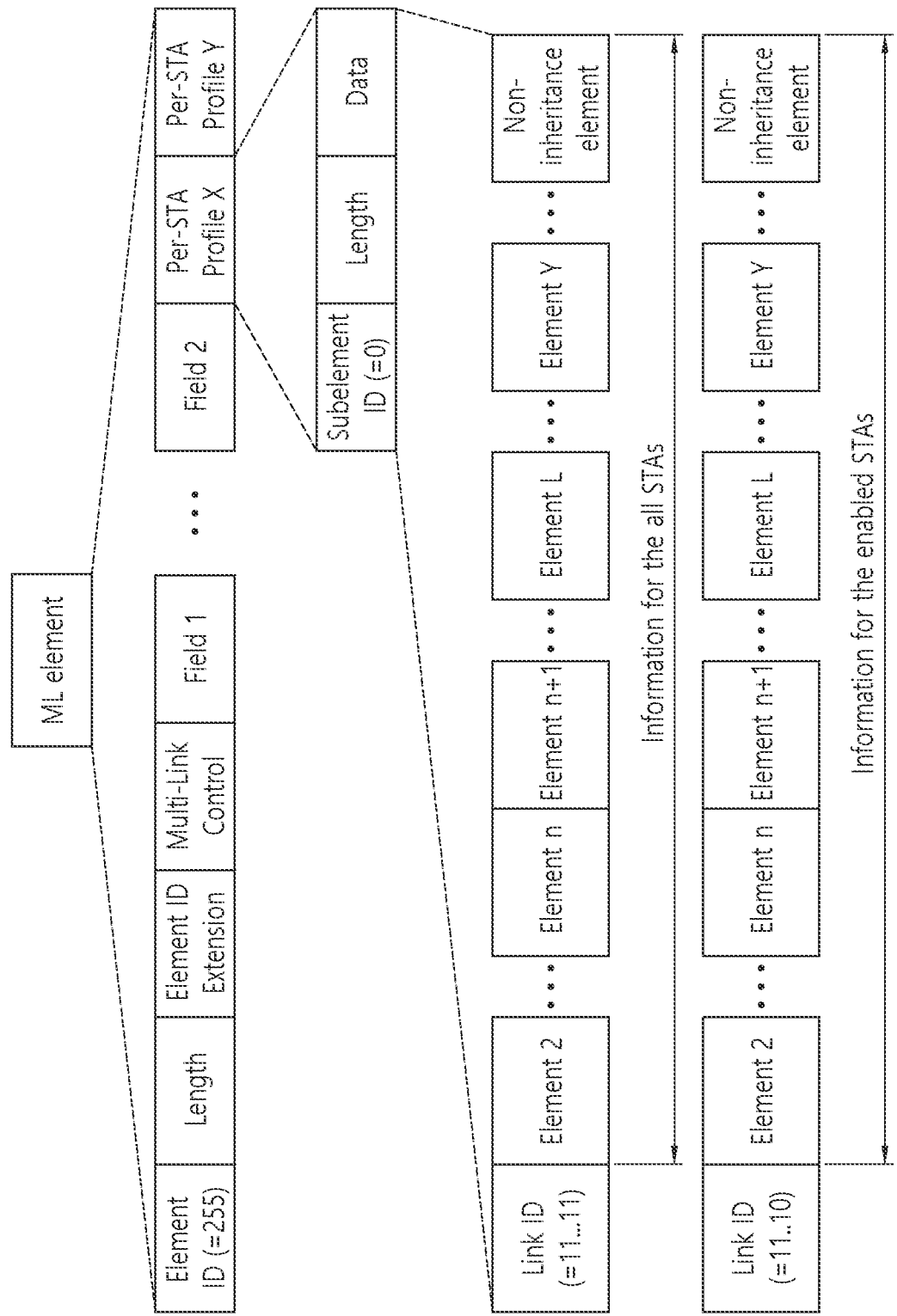
FIG. 10 is a diagram illustrating an embodiment of an ML element.

FIG. 10 is a diagram illustrating an embodiment of an ML element.

Referring to FIG. 10, when all bits of the link ID in the Per-STA profile of the ML element are all set to 1, information included in the Per-STA Profile becomes information for all STAs in the MLD. When the Link ID value is set to −1 (that is, the LSB is set to 0 and all remaining bits are set to 1), information included in the Per-STA Profile becomes information for all enabled STAs in the MLD.

In this specification, for convenience of explanation, it is exemplified that the Link ID is included in the ML element and each Link ID indicates a group of specific STAs when each Link ID has a specific value. The Link ID set to a specific value can be transmitted by other elements or frames other than the ML element.

Figure 11:
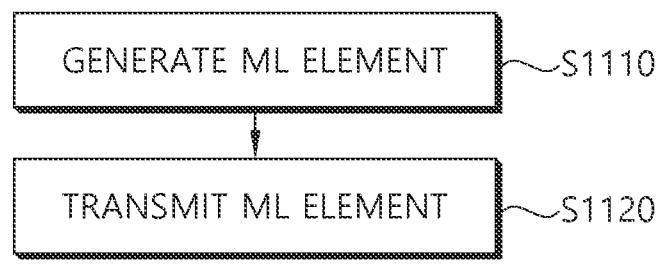
FIG. 11 is a diagram illustrating an embodiment of a transmitting MLD operation method.

FIG. 11 is a diagram illustrating an embodiment of a transmitting MLD operation method.

Referring to FIG. 11, a transmitting MLD may include at least one transmitting STA.

The transmitting MLD may generate an ML element (S1110).

The transmitting MLD may transmit the ML element (S1120).

For example, the ML element may include a field including a common information field and a field including information related to each transmitting STA. For example, the field including information related to each transmitting STA may include a first link ID field and a first link information field that includes information related to a transmitting STA operating in a link related to the first link ID field. For example, the first link information field may include information commonly related to all transmitting STAs included in the transmitting MLD based on the first link ID field having a first value.

For example, the field including information related to each transmitting STA may include a second link ID field and a second link information field that includes information related to a transmitting STA operating in a link related to the second link ID field. For example, the second link information field may include information commonly related to an enabled transmitting STA based on the second link ID field having a second value.

For example, the field including information related to each transmitting STA may include a third link ID field and a third link information field that includes information related to a transmitting STA operating in a link related to the third link ID field. For example, the third link information field may include information commonly related to a transmitting STA in an active mode and a transmitting STA in an awake state while operating in a power saving mode based on the third link ID field having a third value.

For example, the field including information related to each transmitting STA may include a fourth link ID field and a fourth link information field that includes information related to a transmitting STA operating in a link related to the fourth link ID field. For example, the fourth link information field may include information commonly related to a transmitting STA in a doze state based on the fourth link ID field having a fourth value.

For example, a field including information related to each transmitting STA may include a fifth link ID field and a fifth link information field that includes information related to a transmitting STA operating in a link related to the fifth link ID field. For example, the fifth link information field may include information related to a first transmitting STA based on the fifth link ID field having a fifth value. For example, based on the field including information related to each transmitting STA including the fifth link information field, the fifth link information field, not the first link information field, includes information related to the first transmitting STA.

For example, the first value may be a value in which all bits of the first link ID field are set to 1.

Figure 12:
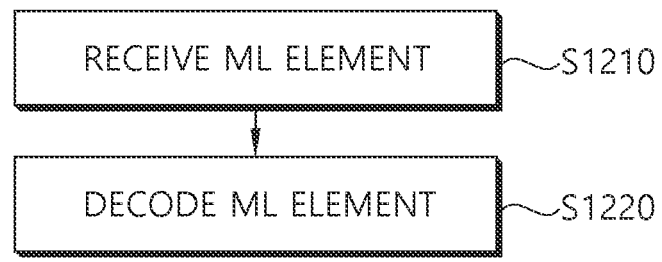
FIG. 12 is a diagram illustrating an embodiment of a receiving MLD operation method.

FIG. 12 is a diagram illustrating an embodiment of a receiving MLD operation method.

Referring to FIG. 12, a transmitting MLD may include at least one transmitting STA.

A receiving MLD may receive an ML element (S1210). The receiving MLD may receive an ML element from the transmitting MLD.

The receiving MLD may decode the ML element (S1220).

For example, the ML element may include a field including a common information field and a field including information related to each transmitting STA. For example, the field including information related to each transmitting STA may include a first link ID field and a first link information field that includes information related to a transmitting STA operating in a link related to the first link ID field. For example, the first link information field may include information commonly related to all transmitting STAs included in the transmitting MLD based on the first link ID field having a first value.

For example, the field including information related to each transmitting STA may include a second link ID field and a second link information field that includes information related to a transmitting STA operating in a link related to the second link ID field. For example, the second link information field may include information commonly related to an enabled transmitting STA based on the second link ID field having a second value.

For example, the field including information related to each transmitting STA may include a third link ID field and a third link information field that includes information related to a transmitting STA operating in a link related to the third link ID field. For example, the third link information field may include information commonly related to a transmitting STA in an active mode and a transmitting STA in an awake state while operating in a power saving mode based on the third link ID field having a third value.

For example, the field including information related to each transmitting STA may include a fourth link ID field and a fourth link information field that includes information related to a transmitting STA operating in a link related to the fourth link ID field. For example, the fourth link information field may include information commonly related to a transmitting STA in a doze state based on the fourth link ID field having a fourth value.

For example, a field including information related to each transmitting STA may include a fifth link ID field and a fifth link information field that includes information related to a transmitting STA operating in a link related to the fifth link ID field. For example, the fifth link information field may include information related to a first transmitting STA based on the fifth link ID field having a fifth value. For example, based on the field including information related to each transmitting STA including the fifth link information field, the fifth link information field, not the first link information field, includes information related to the first transmitting STA.

For example, the first value may be a value in which all bits of the first link ID field are set to 1.

Some of the detailed steps shown in the example of FIGS. 11 and 12 may not be essential steps and may be omitted. In addition to the steps shown in FIGS. 11 and 12, other steps may be added, and the order of the steps may vary. Some of the above steps may have their own technical meaning.

The technical features of the present specification described above may be applied to various apparatuses and methods. For example, the above-described technical features of the present specification may be performed/supported through the apparatus of FIGS. 1 and/or 5. For example, the technical features of the present specification described above may be applied only to a part of FIGS. 1 and/or 5. For example, the technical features of the present specification described above are implemented based on the processing chips 114 and 124 of FIG. 1, or implemented based on the processors 111 and 121 and the memories 112 and 122 of FIG. 1, or may be implemented based on the processor 610 and the memory 620 of FIG. 5. For example, in the apparatus of a transmitting MLD of the present specification, the transmitting MLD includes at least one transmitting STA, and the transmitting MLD comprises a memory and a processor operatively coupled with the memory. The processor is configured to generate an ML element and transmit the ML element. The ML element includes a common information field and a field including information related to each transmitting STA. The field including information related to each transmitting STA may include a first link ID field and a first link information field that includes information related to a transmitting STA operating in a link related to the first link ID field. The first link information field includes information commonly related to all transmitting STAs included in the transmitting MLD based on the first link ID field having a first value.

The technical features of the present specification may be implemented based on a computer readable medium (CRM). For example, CRM proposed by the present specification includes an instruction based on being executed by at least one processor of a transmitting MLD in a WLAN system. In at least one CRM, the transmitting MLD includes at least one transmitting STA, and the transmitting MLD generate an ML element and transmit the ML element. The ML element includes a common information field and a field including information related to each transmitting STA. The field including information related to each transmitting STA may include a first link ID field and a first link information field that includes information related to a transmitting STA operating in a link related to the first link ID field. The first link information field includes information commonly related to all transmitting STAs included in the transmitting MLD based on the first link ID field having a first value.

The instructions stored in the CRM of the present specification may be executed by at least one processor. At least one processor related to CRM in the present specification may be the processors 111 and 121 or the processing chips 114 and 124 of FIG. 1, or the processor 610 of FIG. 5. Meanwhile, the CRM of the present specification may be included in the memories 112 and 122 of FIG. 1, the memory 620 of FIG. 5, or an external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims set forth herein may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method for a wireless local area network system, the method performed by a transmitting multi-link device (MLD) including at least one transmitting station (STA) and comprising:

generating a multi-link (ML) element; and
transmitting the ML element, wherein the ML element includes a common information field and information related to each transmitting STA, wherein the information related to each transmitting STA includes a first link identifier (ID) field related to all transmitting STAs, a second link ID field related to a specific transmitting STA and a link information field, wherein the first link ID field indicates a group of the all transmitting STAs based on a value of the first link ID field, wherein the second link ID field indicates a group of the specific transmitting STAs based on a value of second link ID field, wherein the link information field includes information commonly related to the all transmitting STAs included in the transmitting MLD based on the first link ID field having a first value, wherein the link information field includes information commonly related to transmitting STAs that is enabled based on the first link ID field having a second value, wherein the link information field preferentially includes information related to the specific transmitting STA based on the second link ID field having a third value even if the first link ID field has the first value, wherein the first value is a value in which all bits of the first link ID field are set to 1, and wherein the second value is a value in which a least significant bit (LSB) of the all bits of the first link ID field is set to 0 and all remaining bits of the all bits of the first link ID field are set to 1.

2. The method of claim 1, wherein the information related to each transmitting STA includes a third link ID field and a third link information field, the third link information field including information related to a transmitting STA operating in a link related to the third link ID field, and wherein the third link information field includes information commonly related to a transmitting STA in an active mode and a transmitting STA in an awake state while operating in a power saving mode based on the third link ID field having fourth value.

3. The method of claim 1, wherein the information related to each transmitting STA includes a fourth link ID field and a fourth link information field, the fourth link information field including information related to a transmitting STA operating in a link related to the fourth link ID field, and wherein the fourth link information field includes information commonly related to a transmitting STA in a doze state based on the fourth link ID field having a fifth value.

4. A transmitting multi-link device (MLD) for a wireless local area network system, the transmitting MLD including at least one transmitting station (STA) and comprising:

a transceiver configured to transmit and receive radio signals; and a processor operatively coupled with the transceiver and configured to:

generate a multi-link (ML) element; and transmit the ML element, wherein the ML element includes a common information field and information related to each transmitting STA, wherein the information related to each transmitting STA includes a first link identifier (ID) field related to all transmitting STAs, a second link ID field related to a specific transmitting STA, and a link information field, wherein the first link ID field indicates a group of the all transmitting STAs based on a value of the first link ID field, wherein the second link ID field indicates a group of the specific transmitting STAs based on a value of second link ID field, wherein the link information field includes information commonly related to the all transmitting STAs included in the transmitting MLD based on the first link ID field having a first value, wherein the link information field includes information commonly related to transmitting STAs that is enabled based on the first link ID field having a second value, wherein the link information field preferentially includes information related to the specific transmitting STA based on the second link ID field having a third value even if the first link ID field has the first value, wherein the first value is a value in which all bits of the first link ID field are set to 1, and wherein the second value is a value in which a least significant bit (LSB) of the all bits of the first link ID field is set to 0 and all remaining bits of the all bits of the first link ID field are set to 1.

5. The MLD of claim 4, wherein the information related to each transmitting STA includes a third link ID field and a third link information field, the third link information field including information related to a transmitting STA operating in a link related to the third link ID field, and wherein the third link information field includes information commonly related to a transmitting STA in an active mode and a transmitting STA in an awake state while operating in a power saving mode based on the third link ID field having fourth value.

6. The MLD of claim 4, wherein the information related to each transmitting STA includes a fourth link ID field and a fourth link information field, the fourth link information field including information related to a transmitting STA operating in a link related to the fourth link ID field, and wherein the fourth link information field includes information commonly related to a transmitting STA in a doze state based on the fourth link ID field having a fifth value.

7. A receiving multi-link device (MLD) for a wireless local area network system, the receiving MLD comprising:

a transceiver configured to transmit and receive radio signals; and a processor operatively coupled with the transceiver and configured to:

receive a multi-link (ML) element from a transmitting MLD including at least one transmitting station (STA); and decode the ML element, wherein the ML element includes a common information field and information related to each transmitting STA, wherein the information related to each transmitting STA includes a first link identifier (ID) field related to all transmitting STAs, a second link ID field related to a specific transmitting STA, and a link information field, wherein the first link ID field indicates a group of the all transmitting STAs based on a value of the first link ID field, wherein the second link ID field indicates a group of the specific transmitting STAs based on a value of second link ID field, wherein the link information field includes information commonly related to the all transmitting STAs included in the transmitting MLD based on the first link ID field having a first value, wherein the link information field includes information commonly related to transmitting STAs that is enabled based on the first link ID field having a second value, wherein the link information field preferentially includes information related to the specific transmitting STA based on the second link ID field having a third value even if the first link ID field has the first value, wherein the first value is a value in which all bits of the first link ID field are set to 1, and wherein the second value is a value in which a least significant bit (LSB) of the all bits of the first link ID field is set to 0 and all remaining bits of the all bits of the first link ID field are set to 1.

\* \* \* \* \*